United States Patent [19]

Kihara et al.

[11] 4,445,154
[45] Apr. 24, 1984

[54] MAGNETIC RECORDING AND/OR REPRODUCING APPARATUS

[75] Inventors: Nobutoshi Kihara, Tokyo; Yoshiharu Matsumoto; Kazuo Yamazaki, both of Kanagawa, all of Japan

[73] Assignee: Sony Corporation, Tokyo, Japan

[21] Appl. No.: 377,986

[22] Filed: May 13, 1982

Related U.S. Application Data

[63] Continuation of Ser. No. 154,524, May 29, 1980.

[30] Foreign Application Priority Data

May 31, 1979 [JP] Japan .................................. 54-67790

[51] Int. Cl.³ ........................ G11B 15/66; G11B 23/04
[52] U.S. Cl. ........................................ 360/85; 360/95
[58] Field of Search .................... 360/85, 95, 130, 132; 242/198-200

[56] References Cited

U.S. PATENT DOCUMENTS

| | | | |
|---|---|---|---|
| 3,784,761 | 1/1974 | Moritan et al. | 360/95 X |
| 3,939,491 | 2/1976 | Shigeta | 360/85 |
| 3,969,766 | 7/1976 | Tanaka et al. | 360/85 |
| 3,984,870 | 10/1976 | Inoue | 360/85 |
| 4,122,506 | 10/1978 | Kubo et al. | 360/95 X |

Primary Examiner—John H. Wolff
Attorney, Agent, or Firm—Lewis H. Eslinger; Alvin Sinderbrand

[57] ABSTRACT

An automatic tape loading and unloading device for a magnetic tape recording and/or reproducing apparatus includes a cylindrical tape guide drum having at least one rotary magnetic head which moves in a circular path substantially coinciding with the circumferential surface of the drum. The tape used in the apparatus is stored on supply and take-up reels having the tape wound thereon in a tape holder such as a cassette or cartridge and in use the holder positions the tape supply at a relatively lower level with respect to the tape guide drum. The device further includes a first tape engaging member, for example, tape guide pins, carried by levers which are rotatable about a fixed pivot to draw the tape from the tape supply reel in a diagonally upward direction to the tape guide drum where it is helically wrapped about at least a portion of the circumferential surface of the drum and a second tape engaging member to draw the tape from the tape supply reel in a horizontal direction opposite to the direction of movement of the first tape engaging member.

12 Claims, 15 Drawing Figures

FIG.11
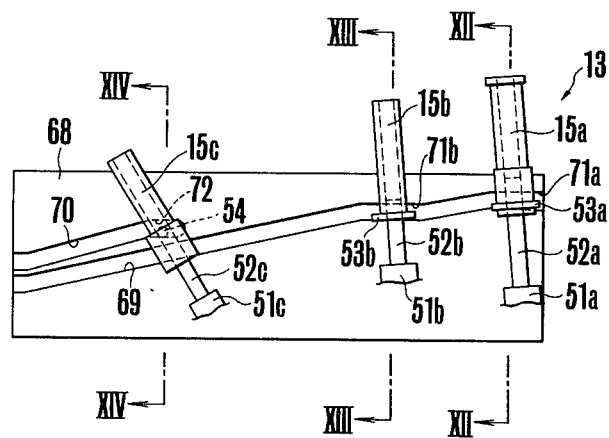
FIG.12    FIG.13    FIG.14
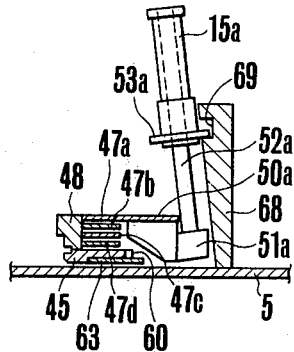 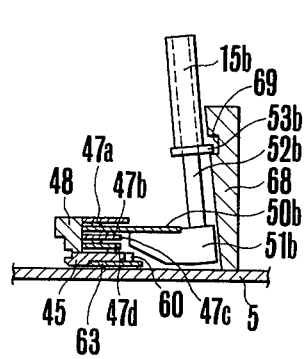 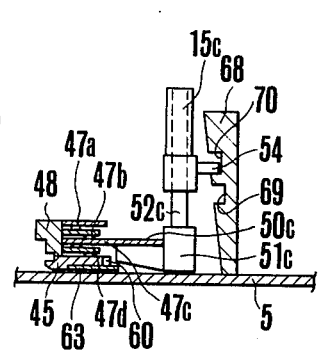

MAGNETIC RECORDING AND/OR REPRODUCING APPARATUS

This is a continuation, of application Ser. No. 154,524 filed May 29, 1980.

BACKGROUND OF THE INVENTION

1. Field of the Invention

This invention relates generally to a magnetic recording and/or reproducing apparatus such as a Video Tape Recorder (VTR) and, more particularly, is directed to an improved automatic tape loading and unloading device for such apparatus.

2. Description of the Prior Art

Existing video tape recording and reproducing apparatus generally comprise a tape guide drum having a rotary magnetic head assembly associated therewith to record or reproduce video signals on or from a magnetic tape which is usually wound on supply and take-up reels with the tape between such reels being wrapped about a portion of the circumferential surface of the drum and being driven by cooperation of capstan and pinch roller and by suitable rotation of the take-up reel. In preparing such a video tape recording and reproducing apparatus for operation, the tape extending between the supply and take-up reels must be placed around at least a portion of the drum circumference so that the tape will be guided thereby with respect to the rotary magnetic head assembly. Conventionally two types of automatic tape loading and unloading devices are used for video signal recording and/or reproducing apparatus.

One type of automatic tape loading and unloading device is called "U-type loading device" and is disclosed in U.S. Pat. No. 3,821,805 assigned to the same assignee as this application. As shown in this patent, the loading device is provided with a loading ring on which plural tape drawing guides are mounted which are inclined to the circumferential surface of a rotary head drum. The tape drawing guides are moved along the circumferential surface of the rotary head drum with the rotation of the loading ring. The tape is drawn from a tape cassette, and is wrapped on the rotary head drum substantially in a U-shape.

In the above-described tape loading and unloading device a pinch roller and a capstan for driving the tape are positioned between the tape exit of the rotary head drum and the tape drawing guide around which the tape turns. The fine tape vibration, which is apt to occur at the tape turning point where the tape wrap angle is large, is intercepted by the tape pinching point between the capstan and the pinch roller and, therefore, such vibration is prevented from being transmitted to the rotary head drum and the tape is smoothly transported. Guides for regulating tape transport at the tape exit and entrance of the rotary head drum can be fixed. Accordingly, the tape runs very smoothly and the adjustment of the tape path is relatively easy. Accuracies of guides of the like arranged in the tape downstream with respect to the pinching point between the capstan and pinch roller have little influence on tape transport. Accordingly, the positioning accuracy of the tape drawing guide for tape turning is not required to be high. As a result, the apparatus can be of simplified construction.

However, in the U-type loading apparatus the fixed guides for tape entrance and exit, the capstan, a sound/control head and an erasing head must be arranged within the loading ring. Accordingly, the outer diameter of the loading ring is very large. The area required for the whole tape loading apparatus must be increased in proportion to the outer diameter of the loading ring. Further, the loading ring is mounted on a chassis at such an angle to the horizontal surface that is about twice as large as the loading angle of the tape to the rotary head drum. Accordingly, the height of the whole tape loading apparatus becomes relatively large.

As above described, this U-type loading apparatus has the drawback that the whole apparatus is unnecessarily large in size.

The other automatic tape loading and unloading device, which is called M-type loading device, is disclosed in U.S. Pat. No. 4,122,506 issued Oct. 24, 1978. In this type loading device two sets of tape drawing guides are horizontally moved at both sides of a rotary head drum. The tape is horizontally drawn out from a tape cassette and is wrapped on the rotary head drum substantially in an M-shape. The capstan is vertically arranged on a horizontal chassis but the rotary head drum is inclined at an angle that is about twice as large as the loading angle of the tape to the rotary head drum. Thus, the height of the tape loading apparatus is little influenced by the tape loading ring. Accordingly, the height of the M-type loading device may be reduced to some extent.

However, in the M-type loading device the two sets of the tape drawing guides, after being moved to both sides of the rotary head drum, are fixed at the tape exit and entrance of the rotary head drum for regulating tape transport to the rotary head drum. With this arrangement it is difficult to position the tape drawing guides with a high degree of accuracy. Accordingly, it is difficult for the tape to run smoothly. Further, the construction for fixing the tape drawing guides is complicated resulting in a relatively higher cost of manufacture.

In addition, a slant guide for changing the path of the tape must be arranged between the tape pinching point of the capstan and pinch roller and the tape exit of the rotary head drum. The tape is wrapped on the slant guide over a considerably large extent and fine tape vibration is apt to be transmitted to the rotary head drum. To avoid the fine tape vibration an impedance roller is provided. However, this requires a more complicated construction.

SUMMARY OF THE INVENTION

Accordingly, it is an object of the present invention to provide a magnetic recording and/or reproducing apparatus with an automatic tape loading an/or unloading device which avoids all of the disadvantages of the devices previously proposed for the stated purposes.

Another object of the present invention is to provide an automatic tape loading and unloading device which is relatively compact so as to minimize the space required for such device.

Still another object of the present invention is to provide an automatic tape loading and unloading device that may be adapted for use in connection with a magnetic recording and/or reproducing apparatus employing a magnetic tape contained in a cassette or cartridge.

In accordance with an aspect of this invention, an automatic tape loading and unloading device for a magnetic recording and/or reproducing apparatus comprises a cylindrical tape guide drum having at least one rotary magnetic head which moves in a circular path substantially coinciding with the circumferential surface of the drum. A holder such as a cassette or cartridge is provided for receiving the tape supply, for example supply and take-up reels having tape wound thereon. In use the tape holder is positioned at a relatively lower level with respect to the guide drum. The device further includes a first tape engaging member in the form of tape guide pins carried by levers which are rotatable about a fixed pivot to draw the tape from the tape supply in a diagonally upward direction so as to helically wrap the tape about at least a portion of the circumferential surface of the tape guide drum and a second tape engaging member to draw the tape from the tape supply in a horizontal direction opposite to the first tape engaging member with respect to the drum.

The above and other objects, features and advantages of this invention, will be more readily apparent from the following detailed description of illustrative embodiments thereof which is to be read in connection with the accompanying drawings.

BRIEF DESCRIPTION OF THE DRAWINGS

FIG. 11 is a developed side view of a guide block portion of the device of FIG. 1;

FIG. 12 is a cross-sectional view taken along line XII—XII of FIG. 11;

FIG. 13 is a cross-sectional view taken along line XIII—XIII of FIG. 11;

FIG. 14 is a cross-sectional view taken along line XIV—XIV of FIG. 11; and

DESCRIPTION OF THE PREFERRED EMBODIMENTS

Figure 1:
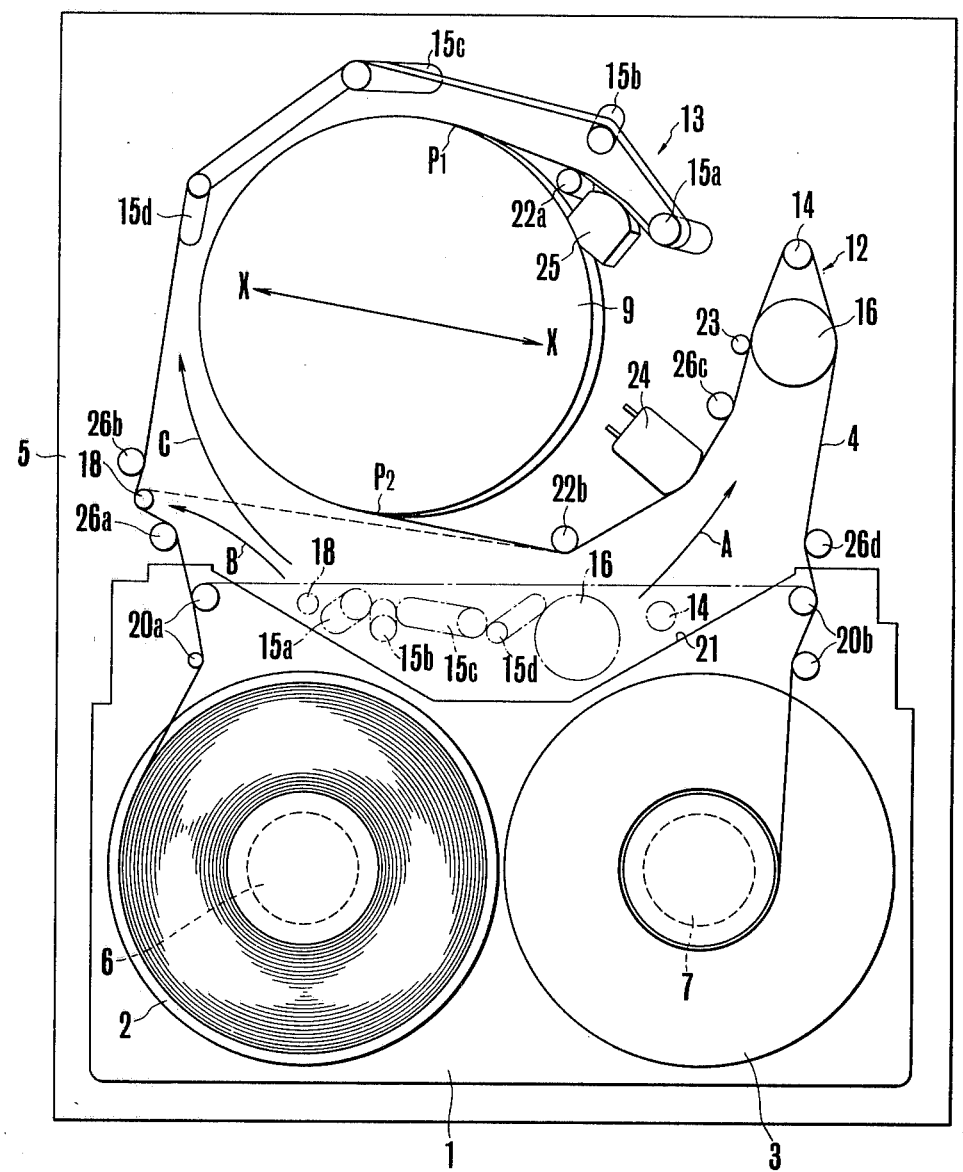
FIG. 1 is a schematic plan view of a tape loading and unloading device in a VTR according to one embodiment of this invention and in which a tape loading operation is shown.

A tape loading and unloading device according to one embodiment of the present invention as used in a magnetic recording and/or reproducing apparatus, such as a VTR, will be described with reference to the accompanying drawings. Initially, an outline of the tape loading and unloading device will be described with reference to FIG. 1 to FIG. 4.

In this embodiment of the invention a tape cassette 1 is provided which includes side by side tape supply reel 2 and a take-up reel 3. Magnetic tape 4 is wound on supply reel 2 and take-up reel 3. Tape cassette 1 is horizontally positioned on a horizontal chassis 5 by a positioning mechanism or cassette holder which is not shown here. Supply reel 2 and take-up reel 3 are engaged with a supply reel mount 6 and a take-up reel mount 7, respectively, which are arranged on chassis 5.

Figure 4:
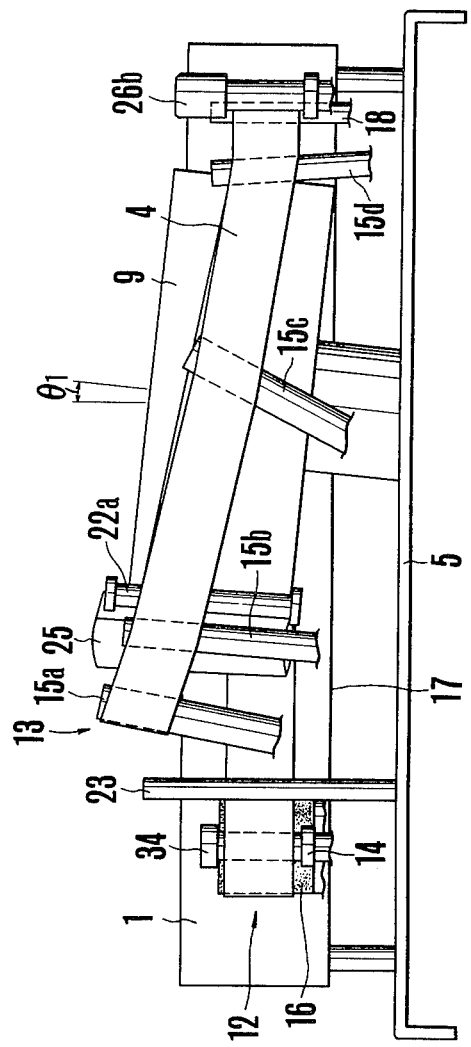
FIG. 4 is a front view of the tape loading and unloading device of FIG. 1.

A rotary head drum 9 having a rotary magnetic head (not shown) is arranged on chassis 5 at a relatively higher level than cassette 1. Drum 9 is located at a position lower than the height $h_1$ of a front lid 10 which is opened upwardly upon insertion of tape cassette 1 into the operative position and drum 9 is inclined at a small angle which corresponds to the loading angle $\theta_1$ of the tape 4 to drum 9, as shown in FIG. 4.

A first tape drawing mechanism 12, arranged at the tape exit side of drum 9, and a second tape drawing mechanism 13, arranged at the tape entrance side of drum 9, are provided with the first tape drawing mechanism 12 mainly constituted by a tape guide roller 14 and second tape drawing mechanism 13 mainly constituted by four tape guide pins 15a to 15d. Tape 4 is horizontally withdrawn from tape cassette 1 by tape guide roller 14 and a pinch roller 16 to drive tape 4 is provided so as to move with tape guide roller 14. Tape guide pins 15a to 15d are designed so as to draw tape 4 at an upwardly inclined path of movement from tape cassette 1 with respect to a bottom surface of tape cassette 1 and tape guide pins 15a and 15d are rotated around the drum 9. The path of tape 4 is directed about tension regulating pin 18.

A pair of guide pins 20a and 20b fixed in cassette 1 are arranged at both sides of the frontal opening 21 of tape cassette 1 and tape guide pins 22a and 22b fixed on chassis 5 are arranged at the tape entrance and exit to drum 9. The loading angle of tape 4 to drum 9 and the running direction of tape 4 are regulated by tape guides 22a and 22b. A capstan 23, a sound/control head 24, an erasing head 25 and tape guide members 26a and 26d are also arranged on chassis 5.

Before a cassette 1 is inserted in the apparatus, tape guide roller 14, pinch roller 16, tape guide pins 15a to 15d and tension regulating pin 18 are located at their original or rest positions shown by dot-dash lines in FIG. 1. With the apparatus in that condition, when a tape cassette 1 is moved downward by the holder and is engaged with reel mounts 6 and 7, tape guide roller 14, pinch roller 16, tape guide pins 15a to 15d and tension regulating pin 18 are inserted at the back side of the tape 4 extending as shown by the dot-dash line in opening 21 of tape cassette 1.

Figure 2:
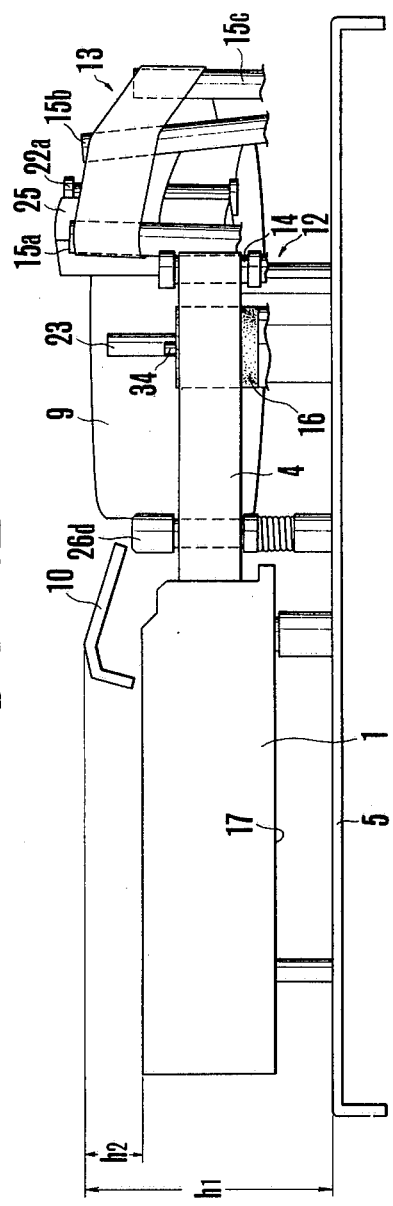
FIG. 2 is a side view of the tape loading and unloading device of FIG. 1 at the tape exit side.

When the loading operation starts tape guide roller 14 and pinch roller 16 are horizontally moved to their operative positions as shown in solid line in FIG. 1 in the direction indicated by arrow A. Tape 4 is caught by the leading tape guide roller 14 and is horizontally drawn to the tape exit side of drum 9 from the tape cassette 1, as shown in FIG. 2.

Figure 3:
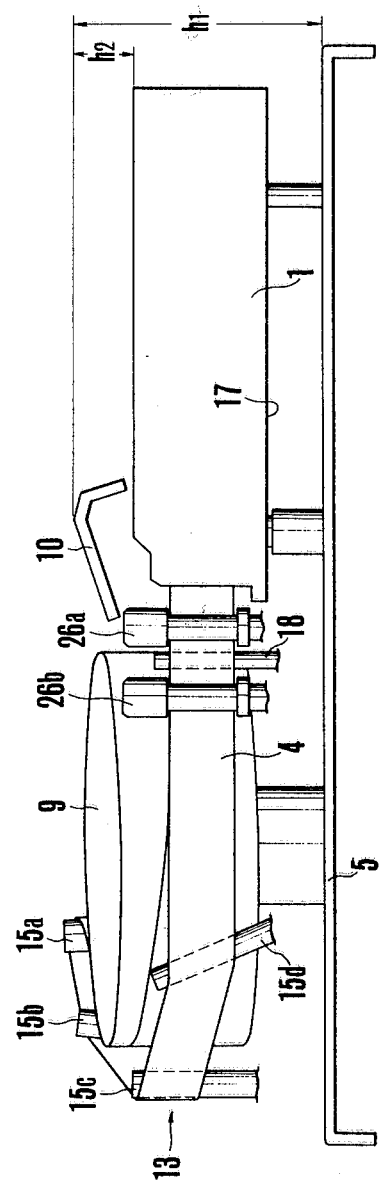
FIG. 3 is another side view of the tape loading and unloading device of FIG. 1 at the tape entrance side.

At the same time, tension regulating pin 18 is first horizontally moved to its operative position shown by solid loine in FIG. 1, in the direction indicated by arrow B and tape 4 is caught by the tension regulating pin 18 and is horizontally drawn from the tape cassette 1 to the position shown by the dotted line in FIG. 1. When tape 4 is in this position, tape guide pins 15a to 15d are moved to their operative positions, shown in solid lines in FIG. 1 in the direction indicated by arrow C. Tape 4 is caught by tape guide pins 15a to 15d in sequence and is drawn upwardly at an inclined path into the tape entrance side of drum 9 from tape cassette 1, as shown in FIG. 3.

In the completion of the loading operation, tape 4 is helically wound or wrapped about more than a 180° portion of the drum 9 and is guided by tape guides 22a and 22b at the tape entrance and exit of drum 9. At the tape exit side tape 4 is in contact with capstan 23, sound-/control head 24 and tape guides 26c and 26d while at the tape entrance side tape 4 is in contact with an erase head 25 and tape guides 26a and 26b.

The drum 9 is inclined at an angle corresponding to the loading angle $\theta_1$ of tape 4 to drum 9 in the tangential direction X—X of the tape 4 at a point $P_2$ at which tape 4 starts to be separated from the drum 9. Accordingly, tape 4 is horizontally threaded from the cassette 1 to tape separation point $P_2$ of the drum 9 through tape guide roller 14. Tape 4 gradually rises from the tape separation position $P_2$ and is thus wound helically on the drum 9. The tape entrance position $P_1$, at which point tape 4 begins to contact drum 9, is substantially higher, by the width of tape 4, than the tape separation position $P_2$. Thus tape 4 extending from entrance guide 22a to tape guide pin 15a is inclined at an angle which is about twice as large as the loading angle $\theta_1$ of tape 4 to drum 9. Tape 4 is gradually lowered from tape guide pin 15a to tape guide pin 15d and it is again on a horizontal path for threading from tape guide pin 15d to tape cassette 1.

After the loading operation of the tape 4 has been completed the forward push button (not shown) of the apparatus is pushed. This moves pinch roller 16 to press tape 4 against capstan 23 through a plunger-solenoid mechanism (not shown) to run the tape 4 for a desired record or reproduction mode.

The unloading operation of the tape 4 after pinch roller 16 is separated from capstan 23 is effected in the reverse order to the loading operation of tape 4. Tape guide roller 14, pinch roller 16, tape guide pins 15a to 15d and tension regulating pin 18 are moved to their original positions shown by in dot-dash lines in directions opposite to the directions shown by the arrows A, B, and C, respectively. At the same time tape 4 is wound up by supply reel 2 and/or take-up reel 3.

Figure 5:
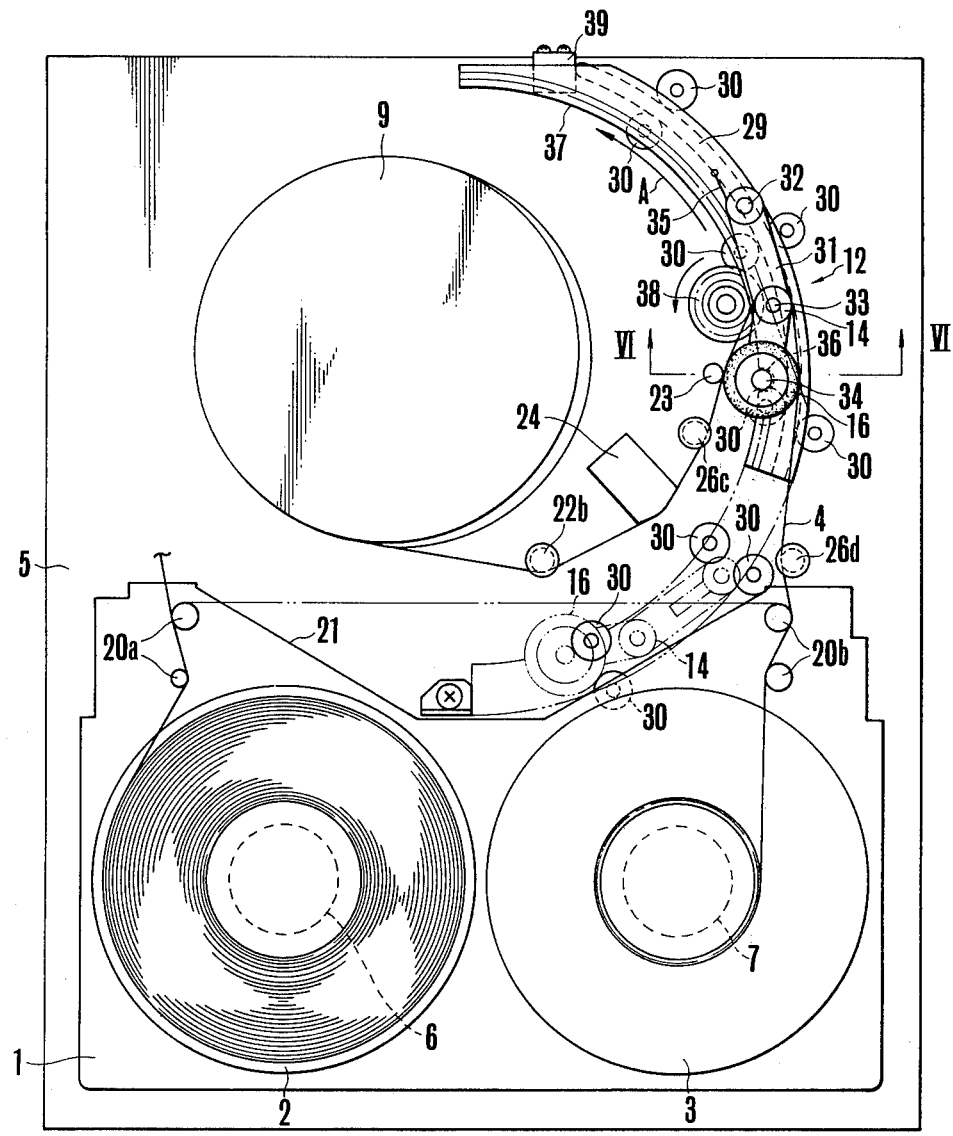
FIG. 5 is a plan view illustrating a first tape drawing mechanism.
Figure 6:
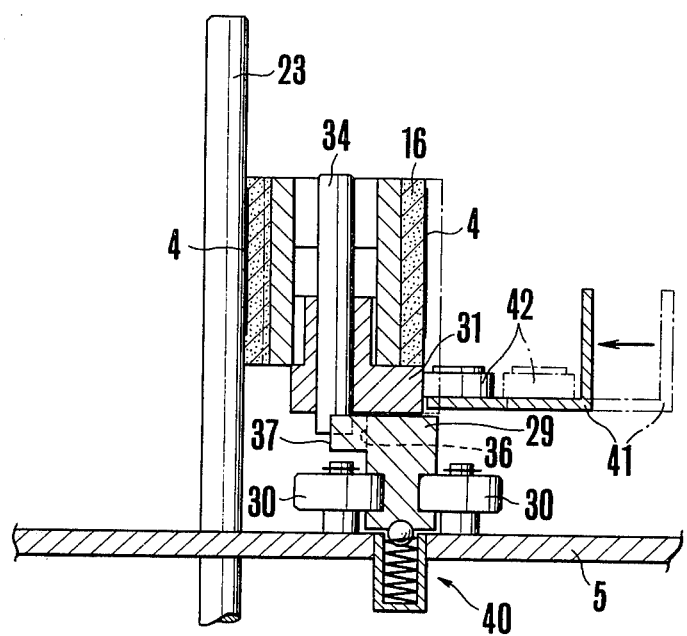
FIG. 6 is an enlarged cross sectional view taken along line VI—VI of FIG. 5.
Figure 7:
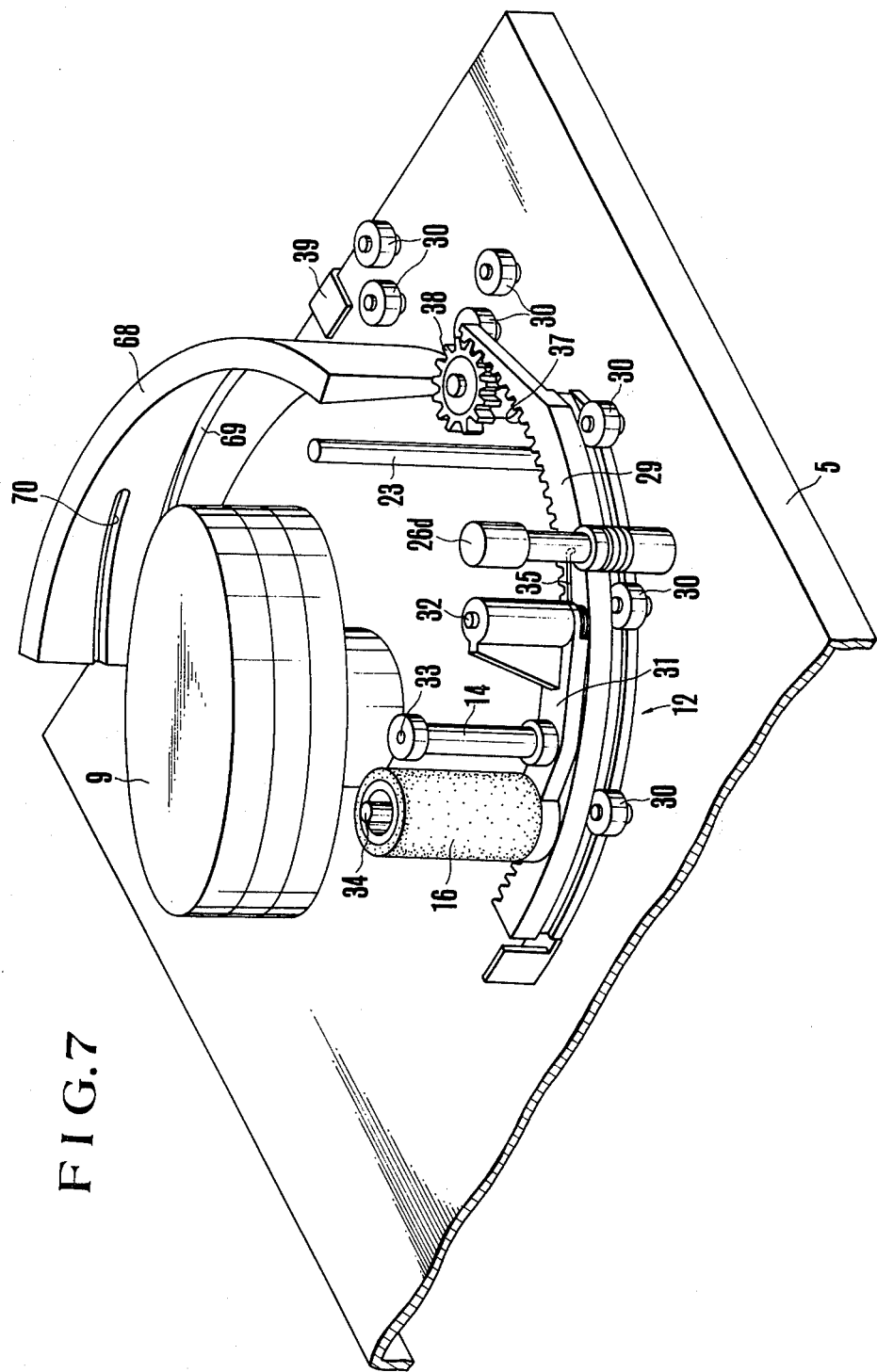
FIG. 7 is a perspective view of the tape loading and unloading device of FIG. 1.

Referring now to FIGS. 5 to 7 as well, the first tape drawing mechanism will be described. As seen in FIG. 5, an arcuate slide 29 is horizontally supported by a plurality of guide rollers 30 mounted on chassis 5 so as to be movable in the direction shown by the arrow A. A guide support arm 31 is rotatably supported at one end by a support pin 32 fixed on slide 29. Tape guide roller 14 and pinch roller 16 are rotatably supported by pins 33 and 34, respectively, fixed on guide support arm 31. A torsion spring 35 urges guide support arm 31 in the counter-clockwise direction (FIG. 5) about pin 32 and the lower end of pin 34 contacts a recess 36 formed in the side wall of the slide 29 to restrict the rotation of guide support arm 31. A rack 37 is formed on the inner side of arcuate slide 29 as clearly shown in FIG. 7 and a drive gear 38 mounted on chassis 5 engages rack 37. Preferably, the drive force for capstan 23 is transmitted through a reversible clutch mechanism to drive gear 38. Drive gear 38 is rotated in the forward and reverse directions by the reversible clutch mechanism and a friction mechanism. Alternatively, a special electric motor may be used for driving drive gear 38 instead of the drive force for capstan 23.

In the unloading mode of tape 4 tape guide roller 14 and pinch roller 16 carried by the arcuate slide 29 are located at their initial positions shown in the dot-dash lines of FIG. 5. During loading of tape 4, drive gear 38 is rotated in the forward direction to move arcuate slide 29 through rack 37 in the direction indicated by arrow A in FIG. 5.

At the completion of the tape loading operation, tape guide roller 14 and pinch roller 16 reach their operative positions shown in solid lines in FIG. 5 and arcuate slide 29 contacts a stopper block 39 fixed on chassis 5 to stop slide 29 there. In this position arcuate slide 29 is fixed in position by a positioning mechanism 40, as shown in FIG. 6.

In operation, when the forward button is depressed a pressing lever 41 is driven by a plunger-solenoid mechanism (not shown) to push the guide support arm 31 through a roller 42, as shown by the solid line in FIG. 6. Guide support arm 31 is rotated in the clockwise direction about pin 32 (FIG. 5) against the spring force of torsion spring 35 and pinch roller 16 is pressed against tape 4 which is pressed against capstan 23. When the stop button is depressed, pressing lever 41 is separated from guide support arm 31, as shown in the dot-dash line in FIG. 6, and guide support arm 31 is rotated back in the counter-clockwise direction (FIG. 5) to its original position under the urging of torsion spring 35 and pinch roller 16 is separated from capstan 23 so no driving force is imparted to tape 4.

In the unloading operation of tape 4, drive gear 38 is rotated in the reverse direction and arcuate slide 29 is moved through rack 37 in the direction opposite to the direction indicated by arrow A in FIG. 5. Tape guide roller 14 and pinch roller 16 are moved back to their original positions as shown in dot-dash lines in FIG. 5. Although not shown, arcuate slide 29 is positioned there by a positioning mechanism similar to that shown in FIG. 6.

Reference is now made to FIGS. 8 to 14 for a description of a second tape withdrawing means. In this mechanism a rotary ring 45 is provided horizontally arranged on chassis 5 under tape guide drum 9 and is supported by plural guide rollers 46 mounted on chassis 5 so as to be horizontally rotatable about an axis which is almost aligned with the central axis of drum 9. Four ring plates 47a to 47d are arranged one above the other on rotary ring 45 and these ring plates are pressed against rotary ring 45 at a predetermined pressure by three pressure members 49a, 49b and 49c which are fixed on an upper surface of an inner ring 48 formed integrally with rotary ring 45. Ring plates 47a to 47d and rotary ring 45 are frictionally rotatable relative to each other. Projections 50a to 50d are formed integrally on the outer edges of ring plates 47a to 47d, respectively, and supporting blocks 51a to 51d are fixed on projections 50a to 50d, respectively. Pins 52a, 52b and 52c are fixed on supporting blocks 51a, 51b and 51c, respectively, and are inclined at predetermined angles. Pins 52a, 52b and 52c are slidably fitted into hollow tape guide pins 15a, 15b and 15c and a fourth tape guide pin 15d is fixed on supporting block 51d and is inclined at a predetermined angle. Tape guide pins 15a to 15d are designed so as to be rotated along the circumferential surface of tape guide drum 9 almost concentrically with the latter. Guide pins 15a and 15b have flanges 53a and 53b formed integrally on their lower ends and a pin 54 is formed integrally with and extends outwardly from the lower end of tape guide pin 15c.

Figure 8:
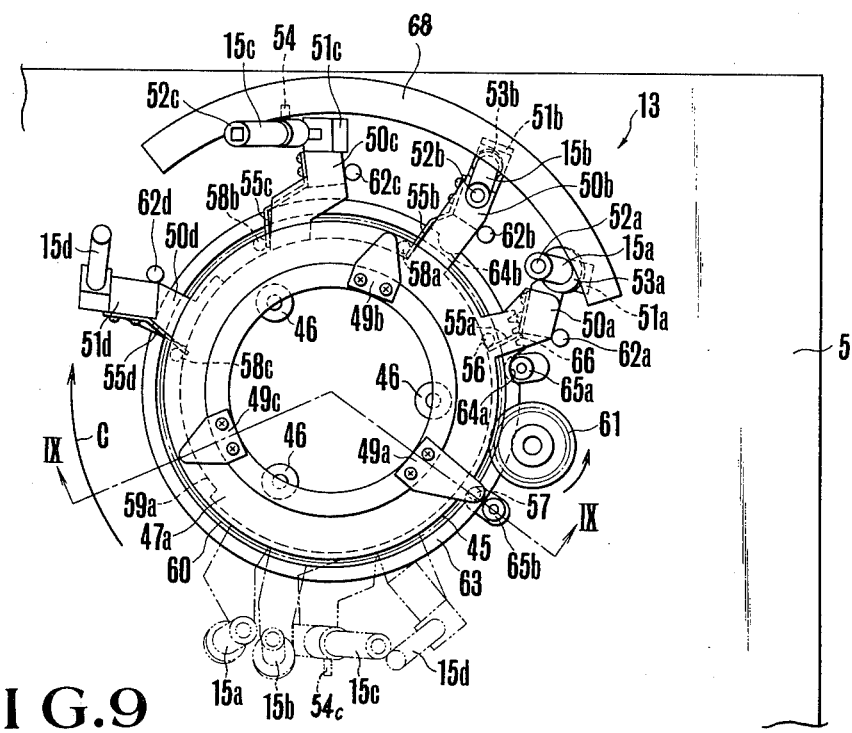
FIG. 8 is a plan view illustrating a second tape drawing mechanism.

As shown in FIG. 8, leaf springs 55a to 55d are fixed to supporting blocks 51a to 51d, respectively. A leader drive pin 56 is fixed on the upper surface of rotary ring 45 and a return pin 57 is fixed on the end of the lower surface of one of the pressing members 49a. Three drive pins 58a, 58b and 58c spaced from each other by predetermined distances are fixed on the lower surface of the uppermost ring plate 47a. Leader drive pin 56 is so designed as to be contactable with leaf spring 55a for driving leader tape guide pin 15a and the other drive pins 58a, 58b and 58c are designed so as to be contactable with leaf springs 55b, 55c and 55d, respectively. Return pin 57 fixed on pressing member 49a is designed so as to be contactable with projection 50a on ring plate 47a and arcuate cut-out portions 59a, 59b and 59c are formed in the outer edges of the lower three ring plates 47b, 47c and 47d so that ring plates 47b, 47c and 47d are rotated by leader drive pin 56.

Figure 9:
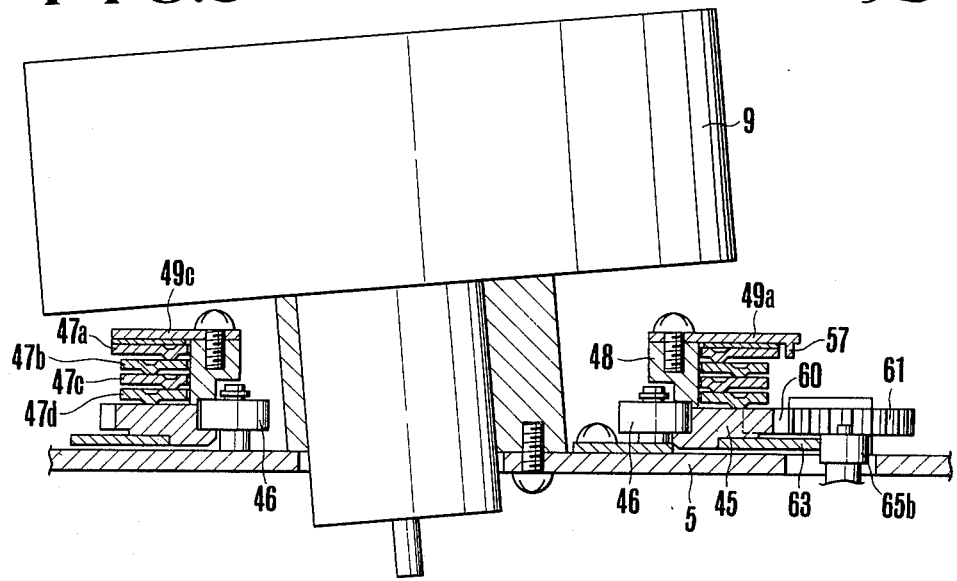
FIG. 9 is an enlarged cross-sectional view taken along line IX—IX of FIG. 8.

As shown in FIG. 9, a gear 60 is formed on the circumferential surface of rotary ring 45 and is engaged with a drive gear 61 which is mounted on chassis 5. In the same manner as drive gear 38, described above, drive gear 61 is driven through a reversible clutch mechanism and a friction mechanism by the drive force for capstan 23 or may be driven by a separate electric motor.

Figure 10:
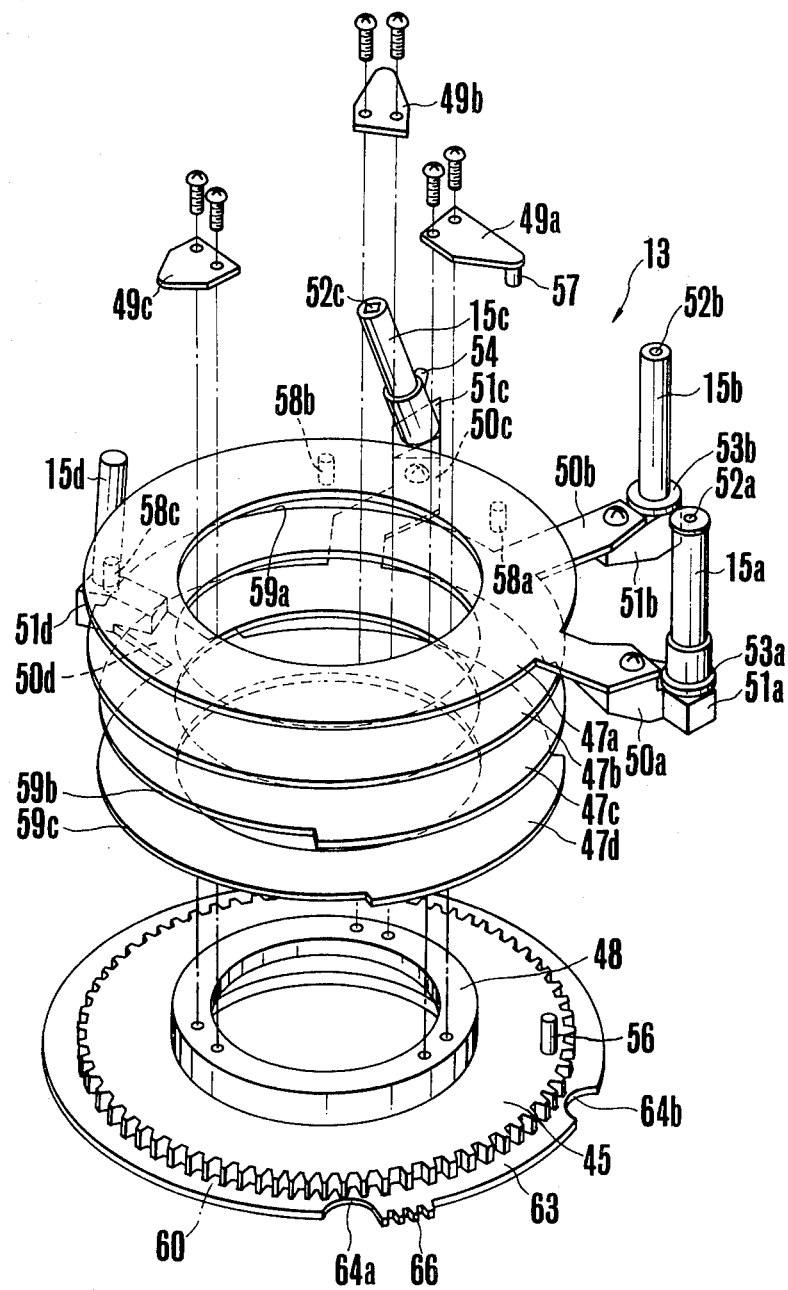
FIG. 10 is an exploded perspective view of the tape loading and unloading device of FIG. 1.

Four stopper pins 62a to 62d are fixed on chassis 5 in order to position tape guide pins 15a to 15d in the position shown by the solid lines in FIG. 8. A ring 63 is fixed on the lower surface of rotary ring 45 and a pair of recesses 64a and 64b are formed in the outer edge of ring 63. A pair of positioning rollers 65a and 65b are mounted on chassis 5 to selectively engage within recesses 64a and 64b to position rotary ring 45 at two fixed positions. A partial gear 66 segment is formed on a part of the outer edge of ring 63 near recess 64a as shown in FIG. 10.

An upstanding arcuate guide block 68 is fixed on chassis 5 and it is curved along the rotational locus of the tape guide pins 15a, 15b and 15c. Two slant guide grooves 69 and 70 are formed in the inside wall of the arcuate guide block 68 (see FIG. 11 as well) and the grooves 69 and 70 gradually ascend towards the tape entrance point. Grooves 69 and 70 receive the flanges 53a and 53b and pin 54, respectively, to guide pins 15a to 15c during their rotational movement.

In the tape unloading mode, tape guide pins 15a to 15d are located at their original positions by rotary ring 45 as shown by the dot-dash lines in FIG. 8. In the tape loading mode, drive gear 61 is rotated and through gear 60 to move rotary ring 45 in the direction indicated by arrow C in FIG. 8. Leader drive pin 56 fixed on rotary ring 45 contacts leaf spring 55a to push ring plate 47a in the clockwise direction. Thus, tape guide pin 15a is first rotated in the direction indicated by arrow C. Then drive pins 58a, 58b and 58c come into contact with leaf springs 55b, 55c and 55d in order, and thereby ring plates 47b, 47c and 47d are driven in sequence and tape guide pins 15b, 15c and 15d are moved in the direction indicated by arrow C one after another to load tape 4. Tape guide pins 15a to 15c are horizontally rotated until they reach guide block 68 while the remaining tape guide pin 15d is horizontally rotated to the end.

When tape guide pins 15a, 15b and 15c reach guide block 68 flanges 53a and 53b and pin 54 go into slant guide grooves 69 and 70 and upon further rotation of rotary ring 45 flanges 53a and 53b and pin 54 are guided upwardly by guide grooves 69 and 70. While tape guide pins 15a, 15b and 15c are rotated in the direction indicated by arrow C they are slid upwardly along the respective inner pins 52a, 52b and 52c which are slidably fitted within guide pins 15a, 15b and 15c. When all of the tape guide pins 15a to 15d reach their operative positions as shown by the solid lines in FIG. 8, the tape loading operation ends. It is thus seen that tape guide pins 15a to 15d are positioned by the fact that supporting blocks 51a to 51d contact stopper pins 62a to 62d and rotary ring 45 is positioned by the fact that recess 64a is engaged by roller 65a. In the loaded condition of the tape 4 the three tape guide pins 15a, 15b and 15c are located at predetermined upper levels, as shown in FIG. 11 to FIG. 14, respectively. Further in the loaded condition of tape 4 flanges 53a and 53b and pin 54 are located at horizontal positioning portions 71a and 71b of guide groove 69 and a horizontal positioning portion 72 of guide groove 70. Thus, tape guide pins 15a, 15b and 15c are stably positioned at their respective operative positions.

Tape 4 is horizontally drawn until leader tape guide pin 15a reaches guide block 68 and then tape 4 is obliquely and upwardly led with the rise of tape guide pin 15a to be helically wrapped about tape guide drum 9.

For tape unloading, drive gear 61 is rotated in the reverse direction and through gear 60 drives rotary ring 45 in the direction opposite to the direction indicated by arrow C. Tape guide pins 15a to 15d are then moved back to their original positions as shown by the dot-dash lines in FIG. 8. At that time tape exit guide 22b is also used as a stopper for positioning tape guide pins 15a to 15d at their original positions.

In the unloading operation of tape 4 tape guide pin 15d supported by supporting block 51d first comes into contact with tape exit guide 22b to stop pin 15d there. Then supporting blocks 51c, 51b and 51a supporting tape guide pins 15c, 15b and 15a contact each other in order to stop there. Finally, return pin 57 comes into contact with projection 50a on ring plate 47a and pushes projection 50a to position tape guide pins 15a to 15d at their original positions as shown by the dot-dash lines in FIG. 8. Rotary ring 45 is positioned at its original position by roller 65b engaged within recess 64b.

Figure 15:
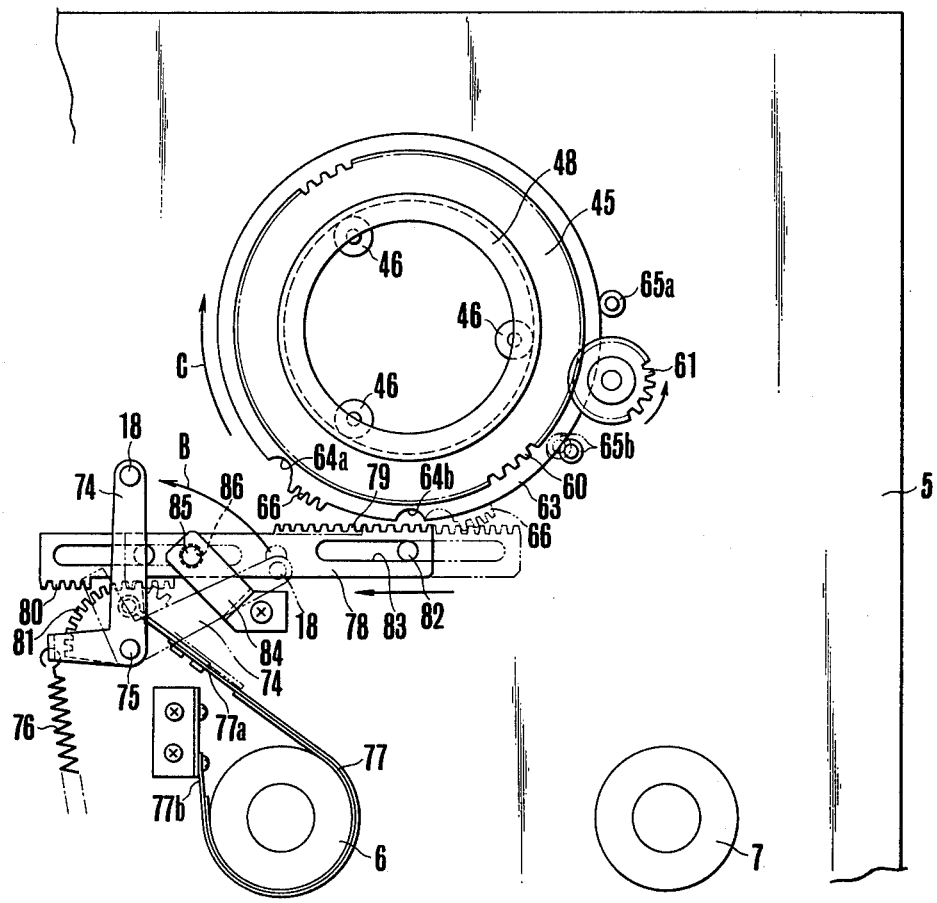
FIG. 15 is a plan view of a mechanism for a tension regulator pin.

Reference is now made to FIG. 15 for a description of a mechanism for the tension regulator pin 18. As seen there, a tension regulator lever 74 is rotatably supported on chassis 5 by a support pin 75. Tension regulator pin 18 is fixed on the upper end of tension regulator lever 74 which is urged by a tension regulator spring 76 in the direction indicated by the arrow B. One end 77a of a band brake 77 is pivoted to tension regulator lever 74. Band brake 77 is wound about the circumferential surface of supply reel mount 6 and its other end 77b is fixed to chassis 5.

A rack slide 78 which includes a pair of oblong holes 83 is slidably supported on chassis 5 by means of a pair of guide pins 82 fixed on chassis 5 and engaged within oblong holes 83. Rack slide 78 includes rack segments 79 and 80 formed on opposite sides. Rack segment 79 engages partial gear 66 on rotary ring 45 and rack segment 80 engages a sector gear 81 fixed on tension regulator lever 74.

In the unloaded condition of tape 4 tension regulator pin 18 fixed on lever 74 is located at its original position as indicated by the two-dot dash line in FIG. 15 and tension regulator lever 74 is urged in the counterclockwise direction as indicated by arrow B. However, rack segment 79 is engaged with partial gear 66 on rotary ring 45 which is positioned at its original position as described above. Accordingly, rack slide 78 is stopped at its original position. Thus, tension regulator lever 74 is restrained from rotating in the direction B.

In the loading operation of tape 4 rotary ring 45 is rotated in the direction indicated by arrow C as described above and rack slide 78 is moved to the left as viewed in FIG. 15 through engagement of rack segment 79 by partial gear 66 and by spring action of spring 76 and tension regulating lever 74 is rotated in the direction indicated by arrow B through rack segment 80 and sector gear 81. Thus, tension regulator pin 81 is instantaneously moved to its operative position as shown by the solid line and rack slide 78 stops at the position where rack segment 80 is separated from sector gear 81. At that time, a projection 85 extending from a positioning leaf spring 84 is engaged with a positioning hole 86 formed in rack slide 78 to fix rack slide 78 in this position and partial gear 66 is separated from rack segment 79 upon further rotation of the rotary ring 45 in the direction indicated by arrow C.

Thus, tension regulator pin 18 is disconnected from rack slide 78 in the operative position shown by the solid line. In the recording or reproducing operation tension regulator pin 18 functions to regulate tension of tape 4 by action of the spring 76.

In the unloading operation of tape 4 rotary ring 45 is rotated in the direction opposite to the direction indicated by arrow C. Partial gear 66 engages rack segment 79 and rack slide 78 is moved in the rightward direction. Rack segment 80 engages sector gear 81 and tension regulating lever 74 is rotated in the direction opposite to the direction indicated by arrow B against the action of spring 76. As a result, tension regulator pin 18 is moved back to its original position shown by the two-dot dash line from the operative position shown by the solid line. Tension regulator pin 18 is positioned at its original position due to the fact that rotary ring 45 is also positioned at its original position as above described.

In the above description tension regulator lever 74 is driven with rotary ring 45. However, the drive of tension regulator lever 74 does not always need to be synchronized with rotary ring 45. For example, a special drive mechanism such as a plunger-solenoid mechanism may be used for driving tension regulator lever 74.

In the above described embodiment, the tape running path extending from the tape exit $P_2$ of tape guide drum 9 into tape cassette 1 is parallel to the horizontally disposed chassis 5 and it is at the same level as the tape contained in tape cassette 1. Accordingly, exit guide 22b tape guides 26c, 26d, capstan 23, reel mounts 6, 7 and the sound/control head 24, as shown in FIG. 1, are vertically mounted on chassis 5.

In the tape running path extending from supply reel 2 through entrance guide 22a and the portion of the circumference of drum 9 to exit guide 22b, the level of tape 4 rises gradually from the level of tape 4 contained in tape cassette 1 to its highest level at tape guide pin 15a at which point tape 4 turns. Thus, tape 4 is wound for about a 180° portion of the tape guide pin 15a and it extends at a slant downwardly to drum 9. Tape 4 is wound at a slanted angle about drum 9 at the loading angle from the tape entrance $P_1$ and the level of tape 4 lowers gradually until it becomes equal to the level of tape 4 contained in tape cassette 1 at the tape exit $P_2$. Tape 4 runs in the upper space with respect to the level of the tape contained in the tape cassette 1. On the other hand, in the conventional U-type tape loading device, the tape extends horizontally from the tape cassette to the tape entrance of the drum and the level of the tape lowers gradually on the circumference of the drum until it reaches its lowest at the tape turning point and it rises gradually from the tape turning point into the tape cassette. Thus, in the U-type tape loading device the tape runs in the lower space with respect to the level of the tape contained in the tape cassette. As shown in FIGS. 2 and 3, the upper space $h_2$ over tape cassette 1 required for front lid 10 to be opened is not used for tape running in the conventional U-type tape loading device but is utilized for the tape loading operation in the embodiment of this invention. Accordingly, the height of the whole tape loading device can be of smaller size in comparison with the conventional tape loading device.

Further, tape guide pins 15a to 15d are so designed as to rotate relatively close to the circumferential surface of drum 9. Accordingly, the spaced required for the whole tape loading device can be of smaller size in comparison with the conventional tape loading device having a much larger loading ring.

As above described, the height and space requirements of the tape loading device according to this invention can be smaller in size in comparison with the conventional tape loading device of the U-type. Moreover, the tape loading device according to this invention has the additional merit of the U-type tape loading device that the fine vibration of the tape which is apt to occur at the tape turning point is not transmitted to the drum side. Thus, the tape runs smoothly and the position accuracy of the tape drawing member at the tape turning point does not need to be so high. Additionally, the construction of the tape loading mechanism is simple and there is not the problem inherent in the conventional tape loading device of the M-type which is of more complicated construction in that the tape loading device according to this invention is not hard to run smoothly.

While preferred embodiments have been described, variations thereto will occur to those skilled in the art within the scope of the present inventive concepts which are delineated by the following claims.

For example, in the above described embodiment, the first tape drawing member 12 and the second tape drawing member 13 are moved with the slide 29 and the rotary ring 45, respectively. However, they may be moved with arms which are respectively swung.

Further, in the above-described embodiments, rotary ring 45 is horizontally rotated and the three hollow tape guide pins 15a to 15c are moved upwardly and downwardly with the rotation of rotary ring 45. However, rotary ring 45 may be designed so as to be rotated along a slant surface connecting the level of the tape contained in tape cassette 1 with the level of the tape at the tape entrance $P_1$. In that case, the tape guide pins 15a to 15c do not need to be moved upwardly and downwardly.

Further, the plan arrangement of the tape loading device is not limited to that of FIG. 1. Any plan arrangement may be used in the tape loading device of this invention if the tape is horizontally drawn from tape cassette 1 at the tape exit side and it is drawn downwardly from the tape cassette 1 to helically wind the tape on drum 9. For example, although the erasing head 25 is arranged at the side of the tape entrance guide 22a in FIG. 1 it may be arranged at the tape downstream side of tension regulator pin 18.

What is claimed is:

1. In a magnetic tape recording and/or reproducing apparatus having a cylindrical tape guide drum having at least one rotary magnetic head moved in a circular path substantially coinciding with the circumferential surface of said drum, tape supply means containing magnetic tape, holder means spaced from said tape guide drum for receiving and positioning said tape supply means at a relatively lower level with respect to said tape guide drum and wherein the axis of said tape guide drum is inclined at an angle with respect to a plane passing through said tape in said tape supply means; the improvement comprising first tape engaging means for drawing tape from said tape supply means and movable from a first position adjacent said tape supply means to a second position adjacent said tape guide drum in a diagonally upward direction to the axis of said drum and a second tape engaging means movable from a first position adjacent said tape supply means to a second position spaced outwardly from said tape supply means in a plane substantially parallel to said plane passing through said tape in said tape supply means and in a direction opposite to the direction of movement of said first tape engaging means thereby to helically wrap a portion of said tape about at least a portion of the circumferential surface of said tape guide drum, said first tape engaging means including a plurality of tape guide pins which are closely spaced to each other and within the confines of the tape supply means when said first tape engaging means is in its said first position and which move in an arcuate path when said first tape engaging means is moving from its said first position to its said second position and whereby said plurality of tape guide pins are disposed about the periphery of said tape guide drum and spaced from each other to a greater degree when said first tape engaging means is in said second position to enable the first tape engaging means to be placed in the same horizontal plane as said tape supply means.

2. A magnetic tape recording and/or reproducing apparatus according to claim 1 wherein said tape supply means includes reels having said magnetic tape wound thereon and wherein said first and second tape engaging means when in their respective first positions are disposed in a space between said reels and wherein the path of the tape between said reels is disposed between said first and second tape engaging means and said tape guide drum.

3. A magnetic tape recording and/or reproducing apparatus according to claim 2 wherein said second tape engaging means is provided with a pinch roller mounted thereon and wherein when said second tape engaging means is moved from its said first position to its said second position said pinch roller engages a portion of said magnetic tape and pushes it into contact with a drive capstan of said apparatus to drive the tape from one of said reels to the other.

4. A magnetic tape recording and/or reproducing apparatus according to claim 1 wherein each said tape guide pin is mounted on a separate support plate member disposed for concentric rotation about said axis of said tape guide drum and wherein said first tape engaging means includes means to rotate each said support plate members to move said guide pins from their said first positions to their said second positions.

5. A magnetic tape recording and/or reproducing apparatus according to claim 4 wherein said first tape engaging means includes a tape tension regulating pin movable from a first inactive position when said first tape engaging means is in its first position to a second active position between a pair of fixed spaced tape guide members thereby to direct the path of tape travel over said tape tension regulating pin when said first tape engaging means is in its said second position.

6. A magnetic recording and/or reproducing apparatus comprising a substantially planar chassis, a cylindrical tape guide drum mounted on said chassis and at least one rotary magnetic head moved in a circular path substantially coinciding with the circumferential surface of said drum, tape supply means containing magnetic tape and having a lid movable to an open position for access to said tape, the axis of said tape guide drum being inclined at an angle with respect to a plane perpendicular to the plane of said chassis; holder means for receiving said tape supply means and operatively positioning the latter with a plane passing through said tape in the tape supply means being parallel with said plane of the chassis and with said lid in its open position extending further from said plane of the chassis than the remainder of said tape supply means, said holder means being positioned relatively closer to said plane of the chassis than said tape guide drum so that the opened lid of the operatively positioned tape supply means does not extend substantially further from said plane of the chassis than does said tape guide drum, and tape engaging means for drawing tape from said operatively positioned tape supply means and movable from a first position adjacent said tape supply means to a second position adjacent said tape guide drum in a direction that extends diagonally away from said plane of the chassis thereby to helically wrap a portion of said tape about at least a portion of the circumferential surface of said tape guide drum.

7. A magnetic tape recording and/or reproducing apparatus according to claim 6; further comprising second tape engaging means movable from a first position adjacent said tape supply means to a second position spaced outwardly from said operatively positioned tape supply means in a plane substantially parallel to said plane passing through said tape in said tape supply means and in a direction opposite to the direction of movement of the first mentioned tape engaging means thereby to helically wrap a portion of said tape about at least a portion of the circumferential surface of said tape guide drum.

8. A magnetic tape recording and/or reproducing apparatus according to claim 7 wherein said tape supply means includes reels having said magnetic tape wound thereon and wherein said first and second tape engaging means when in their respective first positions are disposed in a space between said reels and wherein the path of the tape between said reels is disposed between said first and second tape engaging means and said tape guide drum.

9. A magnetic tape recording and/or reproducing apparatus according to claim 8 wherein said second tape engaging means is provided with a pinch roller mounted thereon and wherein when said second tape engaging means is moved from its said first position to its said second position said pinch roller engages a portion of said magnetic tape and pushes it into contact with a drive capstan of said apparatus to drive the tape from one of said reels to the other.

10. A magnetic tape recording and/or reproducing apparatus according to claim 7 wherein said first tape engaging means includes a plurality of tape guide pins which are closely spaced to each other when said first tape engaging means is in its said first position and which move in an arcuate path when said first tape engaging means is moving from its said first position to its said second position and whereby said plurality of tape guide pins are disposed about the periphery of said tape guide drum and spaced from each other to a greater degree when said first tape engaging means is in said second position.

11. A magnetic tape recording and/or reproducing apparatus according to claim 10 wherein each said tape guide pin is mounted on a separate support plate member disposed for concentric rotation about said axis of said tape guide drum and wherein said first tape engaging means includes means to rotate each said support plate members to move said guide pins from their said first positions to their said second positions.

12. A magnetic tape recording and/or reproducing apparatus according to claim 11 wherein said first tape engaging means includes a tape tension regulating pin movable from a first inactive position when said first tape engaging means is in its first position to a second active position between a pair of fixed spaced tape guide members thereby to direct the path of tape travel over said tape tension regulating pin when said first tape engaging means is in its said second position.

* * * * *